United States Patent [19]

Hierholzer, Jr.

[11] Patent Number: 4,471,422

[45] Date of Patent: Sep. 11, 1984

[54] DC-TO-AC INVERTER

[75] Inventor: Alton G. Hierholzer, Jr., Seguin, Tex.

[73] Assignee: Wide-Lite International Corporation, San Marcos, Tex.

[21] Appl. No.: 223,853

[22] Filed: Jan. 9, 1981

[51] Int. Cl.³ .................... H02H 7/122; H02P 13/16
[52] U.S. Cl. ........................................ 363/56; 363/71; 363/75; 363/97
[58] Field of Search ................... 307/66; 363/55, 56, 363/71, 75, 80, 97, 134, 24-26

[56] References Cited

U.S. PATENT DOCUMENTS

| 3,735,235 | 5/1973 | Hamilton et al. | 363/26 |
| 3,946,301 | 3/1976 | Love | 363/56 |
| 4,013,935 | 3/1977 | Seipmann | |
| 4,079,444 | 3/1978 | Kuhn | 363/56 |
| 4,149,233 | 4/1979 | Frosh | 363/71 |
| 4,150,424 | 4/1979 | Nuechterlein | 363/26 |
| 4,293,902 | 10/1981 | White | 363/26 |

FOREIGN PATENT DOCUMENTS

| 0012547 | 6/1980 | European Pat. Off. |
| 147978 | 11/1980 | Japan . |
| 1501403 | 2/1978 | United Kingdom . |

OTHER PUBLICATIONS

PESC'78 Record, Syracuse, N.Y., U.S.A., pp. 325-30, (Jun. 13-15, 1978), S9025-0054.
Proceedings of Powercon S., San Francisco, CA, U.S.A. pp. F3-1/6, S9177-0092, pp. D2-1/8, S9177-0086.

Primary Examiner—William H. Beha, Jr.
Attorney, Agent, or Firm—Vaden, Eickenroht, Thompson, Bednar & Jamison

[57] ABSTRACT

A dc-to-ac inverter employing a control low power section and a power section. The low power section comprises a square wave generator, cross-coupled NOR latches and low level transistor switches for providing switching current to the power section. The power section employs complementary FET drivers and power switches connected to a battery or other source of dc and a ferro-resonant transformer for changing dc to ac.

The power section is protected by a voltage sensor. In a preferred embodiment, this voltage is proportional to the current through the respective power switches and is used to unlatch the applicable NOR latch, thereby causing shut off of the protected network of the power section.

2 Claims, 3 Drawing Figures

DC-TO-AC INVERTER

BACKGROUND OF THE INVENTION

1. Field of the Invention

This invention pertains to dc-to-ac inverters and specifically to improvements in the protection and reliability of dc-to-ac inverters.

2. Description of the Prior Art

A brief history of dc-to-ac inverters is set forth in the Background of the Invention section of U.S. Pat. No. 3,946,301. The circuit which is described in that patent presents an inverter including several standard sections as the art had been developed at the time of that inverter development, viz., 1974 when the application that matured into that patent was filed.

Basically, the patent embodiment described therein includes a low power or control section and a high power section. The low power section includes a remote switch for connecting the low power section to a battery which is maintained charged by a battery charger, a square wave generator comprised of an oscillator and a divide-by-two circuit, and a pair of low voltage level transistor networks, one of which is operated by each of the complementary square wave outputs. Each of these networks includes a first and second stage transistor. This entire section controls at a low power level the operation of the high power section in push-pull fashion and supplies alternate drive current therefor.

The high power section of the '301 circuit includes a transformer for isolating the sections and for driving power switch driving transistors, which, in turn, control the operation of two banks of high power switch transistors. These high power transistor banks generate a high current square wave across the primary side of a ferro-resonant transformer, such transformer inherently converting its square wave input to a sine wave output.

The power transistor banks are each protected against overload by a resistor-capacitor network that senses the rise in collector voltage when such a transistor bank comes out of saturation and applies an input to the first stage of the related control or low voltage transistor, which results in turning off the second stage low level transistor and suspension of drive current to the driving transistor driving the transistor bank.

Should the square wave generator for some reason quit cycling so as to produce a constant high level output, the second stages of both low voltage or control transistors turn off because the capacitor in the base of these transistors no longer sense a changing voltage condition.

Several short comings of such a circuit have been observed. With respect to the low voltage or control network, when the remote switch is applied after a shut down condition, the square wave generator operates initially at a lower than design frequency as it comes up to speed, thereby providing a turn-on signal for too long a period of time, which tends to overdrive the power transistor banks. Second, the discrete components of the two-stage low voltage control transistors are not as reliable as integrated logic components and are more expensive. With respect to the high power section, the isolation transformer and the power transistor switches are not as reliable as field effect transistors have proven to be. Also, such components are more expensive. The banks of parallel power transistors have proven unreliable in that there is more stress put on some transistors in each bank than on others. Moreover, the imbalance requires precise control and selection of the ferro-resonant transformer shunts, windings, laminations and the like. When there is a failure of a transistor in a bank, the remainder of the transistors, instead of acting as a safety or back-up feature, actually also fail in domino fashion.

Additionally, there has been no way to provide synchronization to phase sensitive loads such as computers and the dimming control networks of HID lighting systems when such loads are switched from the normal ac power distribution line to the output of the inverter.

Finally, for large systems, it may be desirable to have several power sections of inverters at various locations. The isolation transformer and transistor drive arrangements are not sufficiently high impedance devices to permit modularizing for this purpose.

Therefore, it is a feature of the present invention to provide an improved dc-to-ac inverter with improved connections to a battery-regulated power source that maintains the square wave generator portion operable while switching only the last transistor control stage.

It is another feature of the present invention to provide an improved dc-to-ac inverter which incorporates electronic latches for reliably operating the control stages.

It is still another feature of the present invention to provide an improved dc-to-ac inverter not having an isolation transformer or a transistor drive circuit, but a cheaper and more reliable drive system.

It is yet another feature of the present invention to provide an improved dc-to-ac inverter having single stage power transistors instead of inherently unmatched banks of power transistors.

It is still another feature of the present invention to provide an improved dc-to-ac inverter having a protection circuit which monitors the current through the power transistors and not their out-of-saturation mode.

It is yet another feature of the present invention to provide an improved synchronizer and specifically an improved synchronizer that permits switching of phase sensitive loads from being controlled by the normal ac power distribution line to an inverter operating independently of such connection, such as would be the case when there is a line failure.

It is still another feature of the present invention to provide an improved dc-to-ac inverter having high impedance FET drivers in the power section thereof to permit modularizing the high power section so that multiple high power sections can be driven by a common control section.

SUMMARY OF THE INVENTION

The invention embodiments disclosed herein pertain to dc-to-ac inverters having a control or low voltage section and a high voltage or power section. The low voltage section includes a square wave generator for generating complementary square wave voltages at a nominal 60 Hz. Of course, some systems operate with respect to other frequencies and, therefore, 60 Hz is exemplary for a typical operating system. The square wave voltages are respectively connected as one of the inputs to latching networks comprised of cross-coupled NOR gates, which, in turn, activate low voltage switching transistors. Another of the inputs to the respective NOR-gate latches is from the respective networks of the power section of the circuit. When a condition occurs in such section so as to indicate a condition of concern, the NOR gate receives an input, that causes the NOR latch to unlatch and therefore causes the related transistor switch to remove the enabling current for the related power driver. In one embodiment, the collector voltage of the power transistors are monitored for out of saturation occurrence. In another embodiment, emitter currents through the power transistors are monitored for excessive values.

The power section of the circuit incorporates field effect transistors (FET's) for driving respectively connected power transistors into saturation in push-pull fashion. The outputs of these power transistors are connected to the primary winding of a ferro-resonant transformer.

The ferro-resonant transformer converts the applied square wave input to a relatively undistorted sine wave, which is further filtered before being applied to the load, typically an HID lighting system, a computer, or the like.

Some loads are quite phase sensitive, and, therefore, when normal power distribution fails and an emergency system is placed into operation, the phase of the two systems must be synchronized. Therefore, one embodiment of the present invention provides a phase lock system for doing this. The square wave portion of the inverter just described is derived from the power distribution line, with a back-up emergency square wave generator operating without load. A multiplexer steering network selects the power distribution-derived input except in case of failure, when it switches in the output of the emergency generator. A phase detector system together with a voltage controlled oscillator assures that the square wave applied to the latching part of the control circuit does not jump from one portion of a cycle to another, but only gradually drifts over a number of cycles to lock in on the frequency of the emergency system.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope, for the invention may admit to other equally effective embodiments.

In the Drawings.

DESCRIPTION OF PREFERRED EMBODIMENTS

Figure 1:
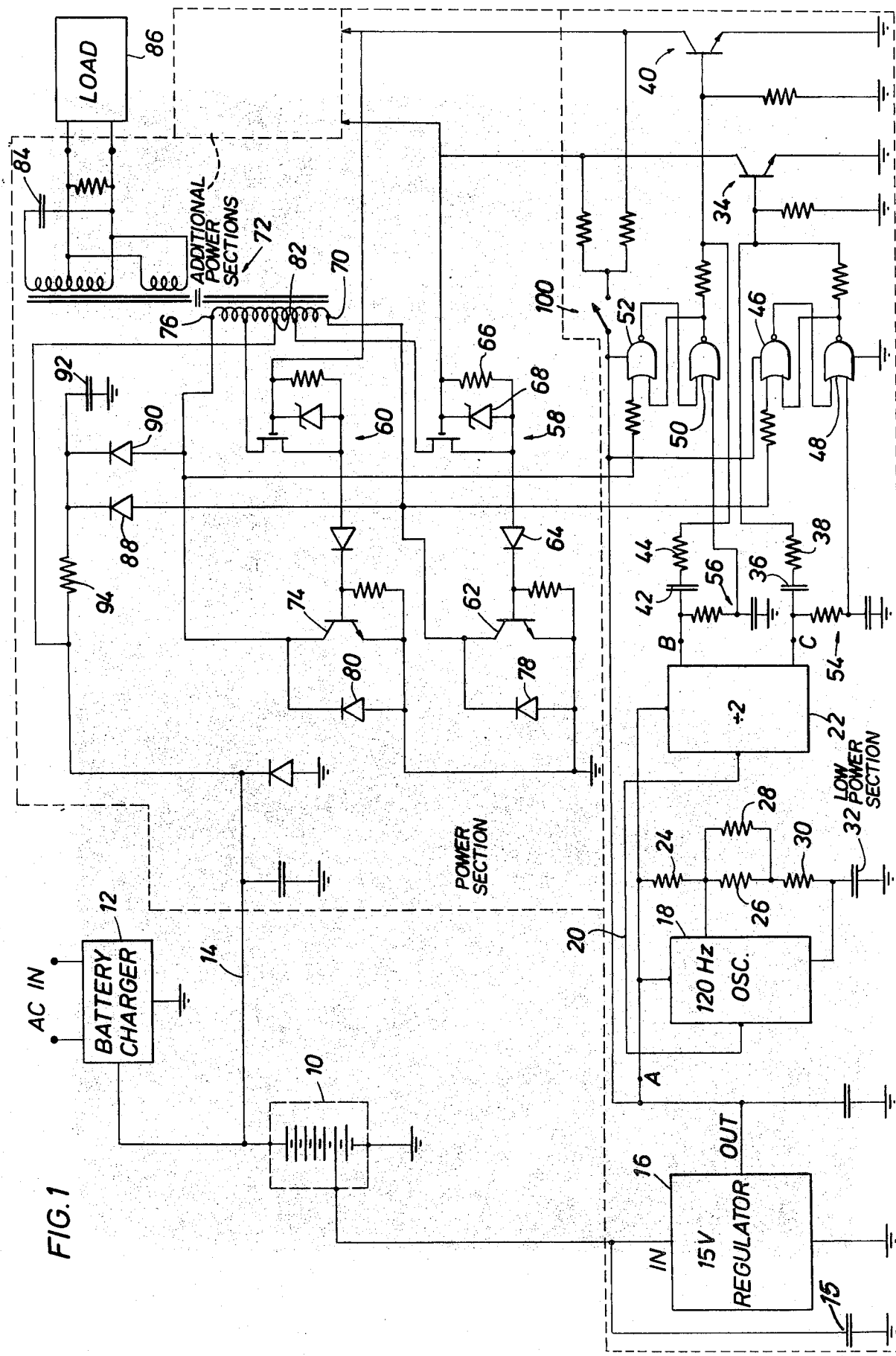
FIG. 1 is a simplified schematic diagram of a first embodiment of the present invention.

Now referring to the drawings and first to FIG. 1, a battery 10 is shown connected to a battery charger 12 to maintain the battery in ready and full charge condition. However, a design factor is usually incorporated such that normal operation results when the battery output is as low as 85% of rated full value. The charger is connected to a power distribution line typically supplying a nominal 120 volts ac at 60 Hz. The battery is connected to the high power section of the inverter on line 14. Although the battery may be other sizes, one convenient nominal battery rating employed with inverters for supplying power to HID lighting systems is 60 volts. Such battery with the inverter described herein is able to efficiently provide 1000 volt amperes to a load.

A tap on the battery at 24 volts is applied to a three-terminal, 15-volt regulator 16. A capacitor 15 to ground protects the regulator against transients. The output of the regulator is applied to the control or low voltage or power section of the inverter.

The first stage of this low power section includes a 120 Hz oscillator, which produces a 120 Hz square wave output on line 20 connected to divide-by-two circuit 22. It is apparent that the oscillator may operate at the desired frequency compatible with the requirements of a particular installation and, therefore, 120 Hz operation is exemplary. Oscillator 18 is preferably an integrated circuit. Resistors 24, 26, 28, 30 and capacitor 32 are connected in well-known fashion to provide the appropriate timing network for 120 Hz operation.

The output from the oscillator is connected to another integrated circuit, divide-by-two circuit 22. Typically, such a circuit is a flip-flop. For oscillator operation at a different frequency, additional divider networks could be employed in order to obtain the desirable output frequency, which for purpose of this discussion is 60 Hz. The outputs from circuit 22 are complementary (180° out of phase), 50% duty cycle square wave voltages. As marked, these voltages appear at points "B" and "C" on the drawing.

These two complementary square wave outputs are applied in push-pull fashion to respective control stages including a low voltage transistor. For example, the output at "C" is applied directly to the base of emitter follower 34 via capacitor 36 and series resistor 38. In like fashion, the output at "B" is applied to the base of emitter follower 40 via capacitor 42 and resistor 44.

Also connected to the base of transistor 34 is a cross-coupled latching NOR network comprising NOR gates 46 and 48. Each of the gates is connected to an energizing 15 volts and to ground, but for simplicity some of these connections are omitted from the drawing. In any event, shortly after the initial direct drive applied to transistor 34, as previously described, a delayed drive is applied via the NOR gate 48, which may need resetting at the same time. This delayed drive, however, assures the resetting of the latch for possible emergency condition sensing to be described below, and provides drive to transistor for the half cycle of the enabling square wave.

On the alternate half cycle, delayed drive is applied to the base of transistor 40 via gate 50 of cross-coupled NOR latches 50 and 52. The delayed drives are developed respectively from RC networks 54 and 56. As previously mentioned the respective portions of the circuits operate in identical fashion with respect to their applied voltages.

The collector of transistor 34 is connected to the gate of FET 58 and the collector of transistor 40 is connected to the gate of FET 60 in the power section of circuit. The source of FET 58 is connected to the base of power transistor switch 62 via blocking diode 64. Resistor 66 connected gate-to-source of FET 58 is a bleeder resistor and zener diode 68 also ensures that the gate of the FET does not float up above the threshold voltage of the FET.

In an actual embodiment of the circuit of FIG. 1, 4 amperes of current are supplied to power switch 62, the collector of which is connected to the lowest connection terminal 70 of the primary winding of ferro-resonant transformer 72. In like manner, power switch 74 is driven by FET 60 and related components, the collector of power switch 74 being connected to the upper connection terminal 76 of the primary winding of ferro-resonant transformer 72. Diode 78 is placed across the collector-emitter junction of power transistor 62 and diode 80 is placed across the collector-emitter junction of power transistor 74. Hence, each of these transistors is a bidirectional current flow device.

The power switches generate a high current square wave across the primary of transformer 72. Power transistors 62 and 74 respectively are driven into deep saturation and to thereby cause a large flow of current from center tap 82 of the transformer primary, through the power transistor, to ground. Because of current flow during certain times when the ferro-resonant transformer is producing reactive currents, power switch diodes 78 and 80 carry currents in the opposite direction. Operation of the power section components produce a square wave voltage span across the primary of the ferroresonant transformer equal to twice the output voltage of battery 10.

The ferro-resonant transformer, also known as a "Sola" regulator, has the desirable capability of transforming a square wave of varying amplitude into a relatively undistorted ac sine wave of constant amplitude and at a frequency equal to that of the square wave input. A capacitor 84 across the secondary winding helps smooth the resulting waveform. Other components can be provided for loading the terminals and to provide connections to a suitable load 86.

Since FET's 58 and 60 are hard driving devices, the drains are respectively connected to suitable taps on the primary of transformer 72. Diodes 88 and 90 are respectively connected to the opposite ends of the primary of transformer 72 and to capacitor 92, which is then connected to ground. A resistor 94 is connected back to center tap 82. Resistor 94 discharges the voltage across capacitor 92 that results during initial switch off times of the power switches. Current is drawn from capacitor 92 through resistor 94 to the positive side of the battery, thereby transforming overshoot energy into heat via resistor 94.

Protection is provided to the power section by connections of the respective collectors of transistors 62 and 74 to the NOR latches of the control network. Hence, if a voltage develops on one of these collectors because the transistor is coming out of saturation preliminary to failure, the respective NOR latch senses this condition and disconnects driving base current to the respective emitter follower 34 and 40. Thus, the control stage including transistor 34 operates in conjunction with three possible control signals. The first is the direct drive via capacitor 36 and resistor 38 when the divide-by-two output is first developed. The second is via NOR gate 48 from delay network 54. Note that this network has a storage capacitor that ensures a supply of current through gate 48 to transistor for a predetermined period of time. The third input is via actuation of NOR gate 46 to deactivate NOR gate 46 in case the voltage supplied to it detects an out-of-saturation voltage for transistor 62. This also removes the base supply from transistor 34 and hence cuts off the supply to FET 58 and, thus, to transistor 62.

It can also be noted that no harm can come to the control portion of the circuit because of failure to switch outputs by the divide-by-two circuit. The NOR gates merely remain unlatched under such conditions.

Additionally, it should be noted that switch 100 is provided in the circuit conveniently for disconnecting power to low power transistors 34 and 40 without disconnecting the remainder of the low power circuit including the square wave generator and the cross-coupled NOR gates. Hence, for example, the oscillator is never shut off and required to come up to speed from a standing start once power has been applied to the overall circuit.

Figure 2:
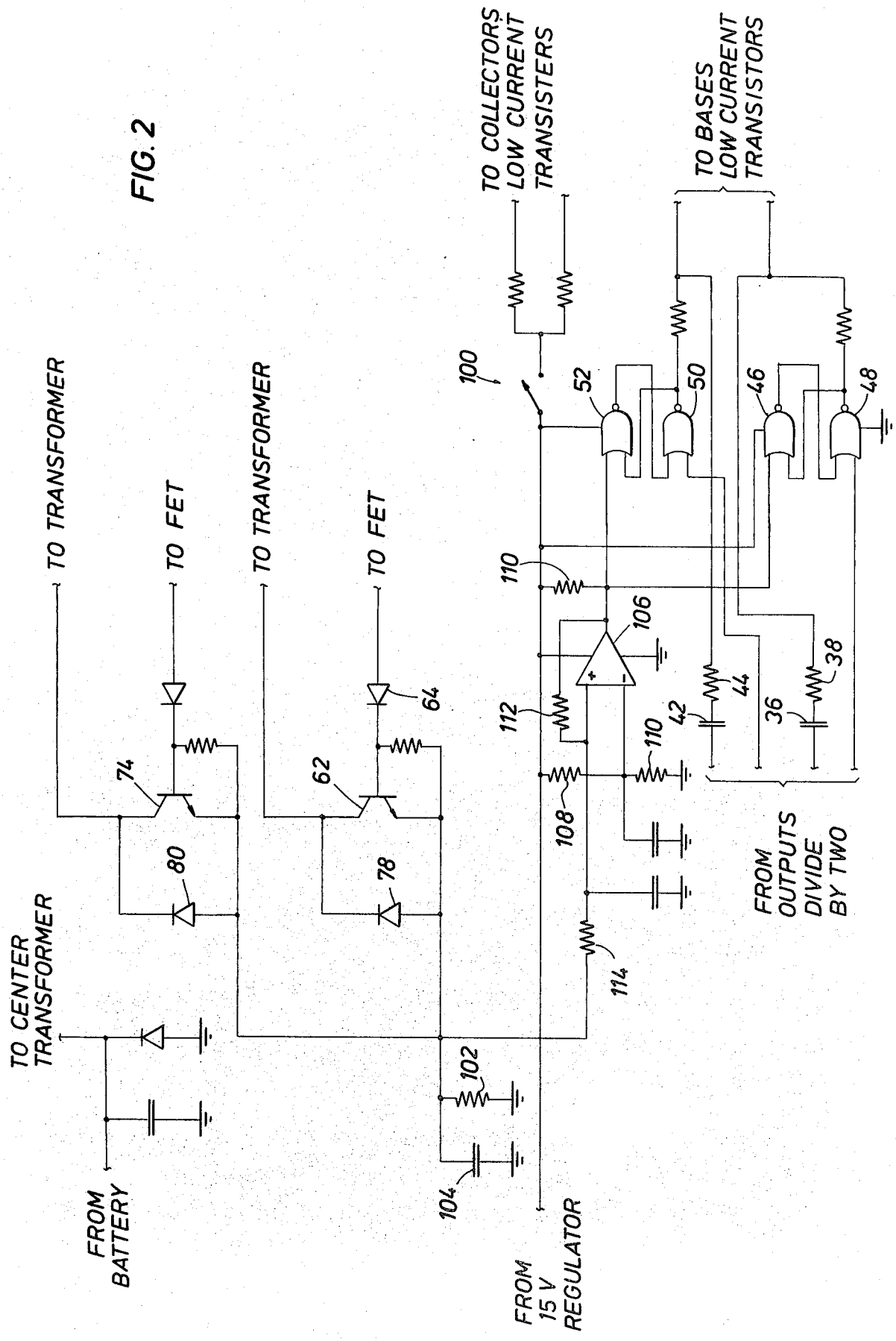
FIG. 2 is a partial simplified schematic diagram of a preferred embodiment of the present invention.

Now turning to FIG. 2, an alternate form of protection is provided to the power section of the circuit. In FIG. 2, the components illustrated that are similar to those shown in FIG. 1 are identically numbered. The differences are in the connections to the power switches of the power section and in the protection circuit connection to the cross-coupled NOR gates.

The common emitter connection of transistors 62 and 74 are connected through a parallel connection of resistor 102 and capacitor 104, thereby making the voltage at the top of resistor 102 proportional to the current therethrough, and through whichever transistor 62 or 74 is conducting at a given time. This protection circuit effectively monitors the emitter current of conducting transistor 62 on the emitter current of conducting transistor 74. It should be further apparent that this type of monitoring does not distinguish between parallel-connected transistors and therefore would not be useful in the case where there was more than one transistor connected in parallel at each location of transistor 62 and 74.

The voltage at the top of resistor 102 is applied to a comparator 106, the comparison reference connection being derived from the voltage divider comprising resistors 108 and 110 connected in series between the 15-volt line and ground. A voltage level above a preset threshold value produces an output from the comparator to the cross-coupled NOR latches. These latches are not connected to sense the out-of-saturation condition of the power switches in this embodiment. In fact, it may be desirable to set the activation level below such condition and therefore at a level which may anticipate an out-of-saturation condition. Also, should the current drive to a power switch fall below the desired value, out-of-saturation would be at a lower voltage level not necessarily detectable by the circuit of FIG. 1, but dangerous to the power switch nonetheless. The sensing detection circuit shown in FIG. 2 would be sensitive in the value of current through the power switch in such event and cause switchoff in the manner previously described. The circuit shown in FIG. 1 would not cause switchoff until a much later time even though the power switch came out of saturation.

Resistor 110 is a pull-up resistor for the open collector of the comparator transistor and resistors 112 and 114 are hysteresis resistors for ensuring that the comparator produces a hard output when a detectable voltage just slightly above threshold is detected.

It should be further noted that both with respect to the circuit shown in FIG. 1 and the circuit shown in FIG. 2, the power drivers are FET devices. Such devices are voltage-to-current transformation devices having an extremely high power gain and require very little power to be driven. This characteristic permits the control circuit or low power circuit components to drive more than one high power section group of components. Hence, it is convenient to package in modular form the square wave voltage generator including the oscillator and the divide-by-two network, the NOR latches and the low power transistor switches in a control module. The high power components including a set of FET drivers, a set of power transistors and the ferro-resonant transformer are included in a high power module which is connected conveniently in parallel with other similar high power modules so as to provide power to various load segments, such as lighting components by areas. One control module can provide actuation for up to about six power modules.

Figure 3:
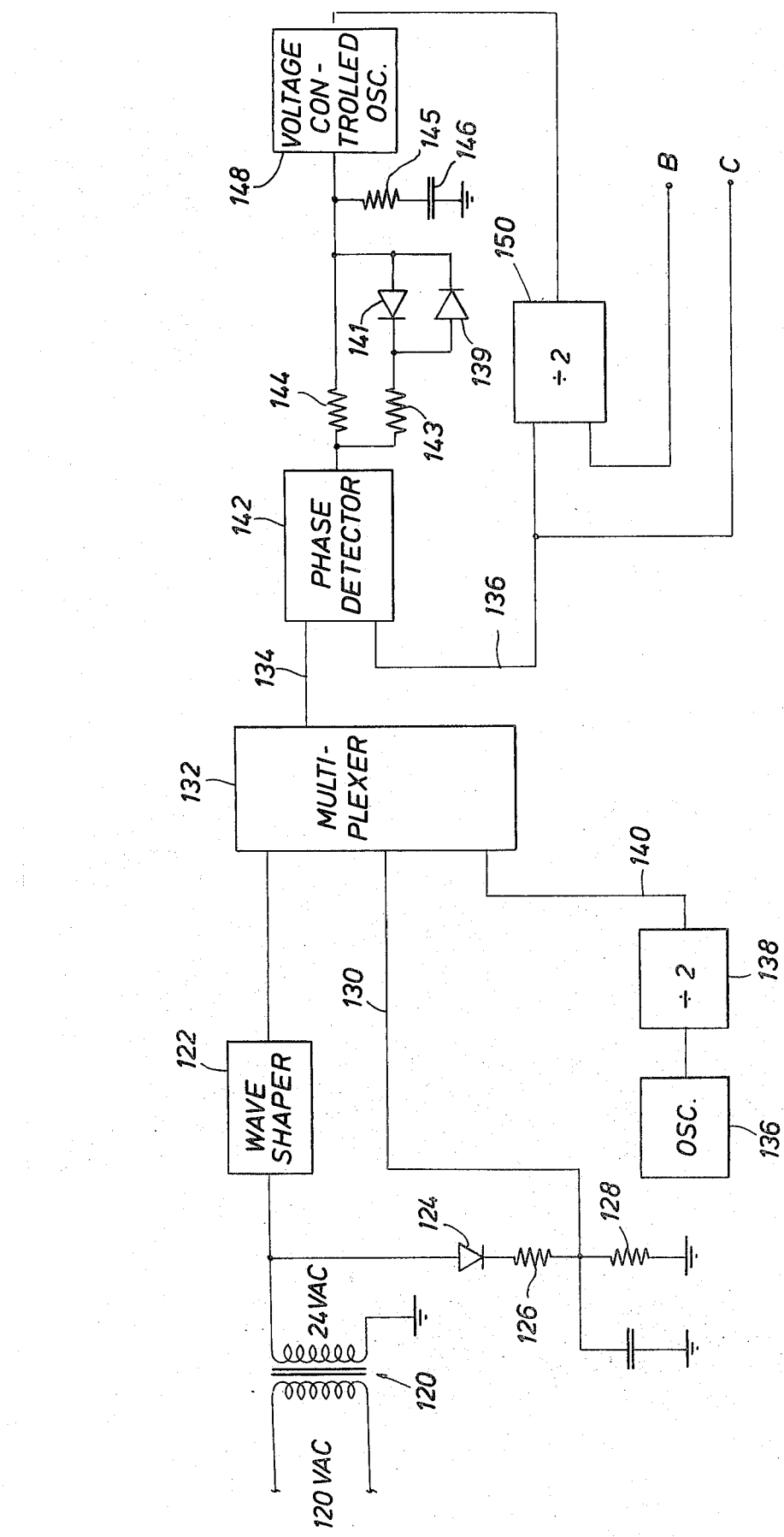
FIG. 3 is a block diagram of phase lock apparatus useful in substitution for the square wave generator shown in FIGS. 1 and 2 for switching from a power distribution line controlled system to an emergency system without phase jumps, which operation is important to some loads.

Now referring to FIG. 3, a phase-lock synchronizer circuit is shown suitable for substitution in FIG. 1 for the square wave generator.

Line voltage is transformed to a lower value, for instance 24 volts, in transformer 120 and shaped in wave shaper 122 so as to produce a 60 Hz square wave. The wave shaper may be an overdriver transistor, an operational amplifier or other equivalent circuit for this purpose. A diode 124 rectifies the 24 volts to dc, which is subsequently further lowered in voltage by a divider comprised of resistors 126 and 128. When the line voltage is at an acceptable level, there is an output on line 130 that steers multiplexer 132 to select the square wave from wave shaper 122 to be supplied on output line 134.

Oscillator 136 and divide-by-two circuit 138, similar to circuits 18 and 22 described in connection with FIG. 1, operate to produce a square wave output on line 140 to multiplexer 132. If the steering voltage on line 130 is below a predetermined value, the square wave on line 140 is supplied to output line 134. However, there is no assurance that the phase of the voltage on line 140 is the same as the phase of the voltage from wave shaper 122.

Phase detector 142 receives the voltage on line 134 and compares it to the voltage on line 136. When the two are in phase, there is produced a nominal voltage output. If for a given half cycle of the reference input, there is more of a positive polarity for the compared input than for the reference input, then there is a larger than nominal voltage output. On the other hand, if for a given half cycle of the reference input, there is less of a positive polarity for the compared input than for the reference input, then there is a less than nominal voltage output. The same development occurs for the negative half cycles. Resistors 144 and 145 and capacitor 146 are a low pass filter for supplying the input to voltage controlled oscillator (VCO) 148, which produces a nominal 120 Hz square wave output. Resistor 143 and diodes 139 and 141 in series with resistor 143 are a rapid control network when there is a large phase error voltage output that exceeds the threshold voltages of the diodes, thereby effectively placing resistors 143 and 144 in parallel. When this occurs, the time constant for the circuit is reduced, thereby making a more rapid correction than for a lower phase error voltage. In a preferred configuration, phase detector 142 and VCO 148 are integrated circuit components, such as available on RCA circuit CD4046. The output is divided in divide-by-two circuit 150 and produces two complementary outputs, one on line 136 and both of which can be substituted for the outputs from the square wave generator network shown in FIG. 1 at "B" and "C". In making the substitution, the network in FIG. 1 must also be disconnected at "A".

In operation, when the voltage on line 134 switches from one phase to another, the output of the phase detector goes to another level, which is filtered, and which, over many cycles, gradually changes the output from the VCO, which again will be stabilized when the phase of voltages 134 and 136 are again synchronized. There is no sudden phase change at "B" and "C" when such a change occurs, which is very important to some phase sensitive loads. Many computers and the dimming networks of some HID lighting systems are examples of phase sensitive loads.

In the above discussion and in the drawing, the ground connections are shown for convenience. In an actual installation, these may be at a potential other than ground, but at a common value. Some components are not labelled, but are well-known components. For example, the diode connected to the high side of the battery just assures that a fuse (not shown) will blow if the battery connected into the circuit is accidentally connected backwards.

While particular embodiments of the invention have been shown and described, it will be understood that the invention is not limited thereto, since many modifications may be made and will become apparent to those skilled in the art. For example, an oscillator, divide-by-two circuit is only one method for creating a square wave. Other square wave generators can be employed in the invention. Also, for example, the latches have been described as cross-coupled NOR latches, but it will be apparent that a set-reset flip-flop circuit would operate in the same manner.

What is claimed is:

1. A dc-to-ac inverter, comprising
   a square wave generator for generating a square wave having complementary square wave outputs,
   first and second latches connected respectively to said complementary square wave outputs,
   first and second low power switching transistors activated respectively by the outputs of said first and second latches,
   first and second power switch drives activated respectively by said first and second low power switching transistors,
   first and second electronic power switches connectable to a dc source and activated respectively by said first and second drivers into saturation, alternate phase high output voltages occurring as said power switches respectively come out of saturation preliminary to failing,
   a ferro-resonant transformer connected to the outputs of said first and second power switches for producing an ac output,
   said first and second latches respectively activating said low power switching transistors during the low portion of the respective square wave outputs as long as said respective output from power switches is below a predetermined voltage level, a voltage level in excess of said predetermined voltage level causing said respective latch to deactivate said respective low power switching transistor, said first and second latches including cross-coupled NOR gates, and
   a delayed input circuit for each of said first and second latches for insuring proper initial activation of said respective low power switching transistor, and a low voltage switch for deactivating said first and second low power switching transistors without deactivating said square wave generator.

2. A dc-to-ac electronic inverter, comprising a square wave generator for generating a square wave having complementary square wave outputs, first and second latches connected respectively to said complementary square wave outputs, first and second low power, switching transistors activated respectively by the outputs of said first and second latches, first and second power switch drivers activated respectively by said first and second low power switching transistors, first and second electronic power switches connectable to a dc source and activated respectively by said first and second drivers into saturation, the current therethrough being less than a predetermined value under normal load and internal operating conditions, and a ferro-resonant transformer connected to the outputs of said first and second power switches for producing an ac output, said first and second latches respectively activating said low power switching transistor during the low portion of the respective square wave outputs as long as the respective current through said power switches is below a predetermined current level causing said respective latch to deactivate said respective low power switching transistor, said first and second latches including cross-coupled NOR gates, and a delayed input circuit for each of said first and second latches for ensuring proper initial activation of said low power switching transistors.

* * * * *